Nov. 15, 1960  A. J. ROUBAL  2,960,276
JAW CRUSHER
Filed April 26, 1954  3 Sheets-Sheet 1

Inventor
Alexander J. Roubal
by Wayne B. Easton
Attorneys

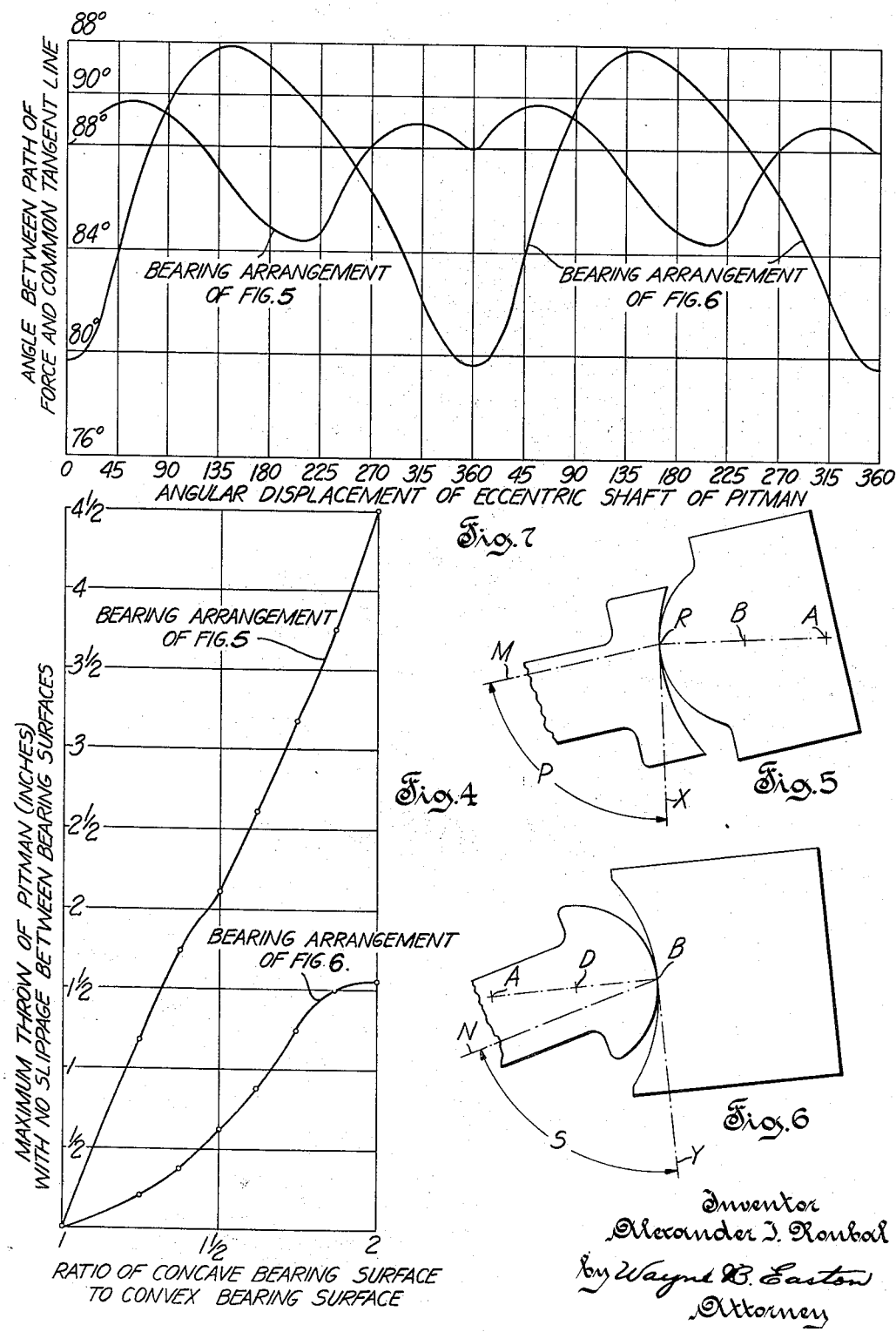

Nov. 15, 1960 A. J. ROUBAL 2,960,276
JAW CRUSHER

Filed April 26, 1954 3 Sheets-Sheet 3

Inventor
Alexander J. Roubal
By Wayne B. Easton
Attorney

United States Patent Office 2,960,276
Patented Nov. 15, 1960

2,960,276

JAW CRUSHER

Alexander J. Roubal, Milwaukee, Wis., assignor to Allis-Chalmers Manufacturing Company, Milwaukee, Wis.

Filed Apr. 26, 1954, Ser. No. 425,403

3 Claims. (Cl. 241—219)

This invention relates to jaw crushers and particularly to a new and improved bearing arrangement for the toggle mechanism of a jaw crusher. This is a continuation in part application of an application filed January 12, 1951, Serial No. 205,739, and now abandoned.

In general the invention pertains to the providing of a novel bearing arrangement for the toggle mechanism of a jaw crusher. Bearings of some kind must be provided for a jaw crusher toggle mechanism because operation of the pitman causes angular movement of the toggle plates relative to the jaw, pitman and frame to which the toggle plates are connected.

In the present invention the bearings mounted on the toggle plates are provided with concave surfaces which have larger radii of curvature than the respective cooperating bearings on the jaw, pitman and frame which are provided with convex surfaces. The advantage of this bearing arrangement is that only a pure rolling contact is obtained between the cooperating bearing surfaces during the entire angular movement of the toggle plates relative to the jaw, pitman and frame. This result has never been obtained in the prior art in that the toggle mechanism bearings of all prior art jaw crushers operate with either pure sliding contact or with a combined sliding and rolling contact between the cooperating bearing surfaces. An advantage of completely avoiding sliding contact between the cooperating bearing surfaces is that the wearing effect of the sliding action is avoided, there being appreciably less wear involved with rolling contact. Another advantage is that the necessity of lubricating sliding type bearings in prior art toggle mechanisms is eliminated because no lubrication for the toggle mechanism bearings is required when there is only a pure rolling contact between the cooperating bearings. At present all commercial jaw crushers are provided with lubricating systems for the toggle mechanism bearings except for the commercial jaw crushers which embody the present invention.

The desirability of having only rolling contact between the cooperating bearings of a jaw crusher toggle mechanism has been recognized for many years as evidenced by a patent to E. S. and H. H. Blake, U.S. 226,964, which issued April 27, 1880. In the Blake patent, convex bearing surfaces are provided on the toggle plates and cooperating concave bearing surfaces having larger radii of curvature are provided on the jaw and frame of the crusher. In the present invention the concave bearing surfaces are provided on the toggle plates and the cooperating convex bearing surfaces are provided on the jaw, pitman and frame of the crusher.

It has been determined by comparative tests that with the toggle mechanism bearing arrangement of the present invention, continuous rolling contact is obtained between the cooperating bearings for angular movements of the toggle plates relative to the jaw, pitman or frame, having magnitudes which are approximately three times greater than corresponding angular movements of the toggle plates in the Blake construction. This superiority is of critical importance with regard to commercial jaw crushers because the advantages of rolling contact are obtained only when the rolling contact is continuous for the entire angular movement of a toggle plate. If in a particular crusher the Blake bearing arrangement affords rolling contact only during three-fourths of the angular movement of a toggle plate and permits sliding contact during one-fourth of the angular movement of the toggle plate, no advantage is gained because the wearing effects of sliding contact would still be present and lubrication of the bearings would still be required.

In a jaw crusher embodying the Blake bearing arrangement and in which the above referred to limitation of the Blake bearing arrangement is critical, the difficulty cannot be avoided by reducing the maximum angular movements of the toggle plates. The reason is that the maximum angular movements of the toggle plates are determined by other factors such as the required throw for the swing jaw and the leverage to be obtained with the toggle mechanism.

A principal object of the invention is to provide a jaw crusher toggle mechanism in which the bearing surfaces thereof cooperate to produce continuous rolling contact for much larger angular movements of the toggle plates, on the order of three times larger, than has been achieved by the prior art.

Another object is to provide a jaw crusher toggle mechanism in which the cooperating bearing surfaces thereof operate dry and therefore require no lubrication whatsoever. Except for commercial jaw crushers embodying the present invention, this object has never before been realized in a commercial jaw crusher.

Another aspect of the present invention concerns the positioning of the concave bearing surfaces on the toggle plates. Jaw crusher toggle plates are required to transmit tremendous forces to the swing jaw and accordingly are of very heavy construction to withstand these forces. With the particular bearing arrangement of the present invention shown in Figs. 1 and 2 of the accompanying drawings, the heavy toggle plates operate at lower positions relative to the bearings on the jaw, pitman and frame than do toggle plates equipped with conventional bearing arrangements. In such case when a toggle plate operates in the lower position, the toggle plate is subjected to eccentric loading which tends to deflect or bend the toggle plate. This is because the force transmitted through the toggle plate has a path which is above a plane which divides the toggle plate into upper and lower halves. It is accordingly another object of the invention to arrange the concave bearing surfaces on the toggle plates in such a manner that eccentric loading of the toggle plates during operation of the crusher is avoided.

The novel features of the invention and how the objects referred to above are achieved will appear from the specification and the accompanying drawings forming a part of this application, and all these novel features are intended to be pointed out in the claims.

In the drawings:

Fig. 4 is a graph showing a comparison between the toggle mechanism bearing arrangements of the present invention and of the patent to Blake et al., U.S. 226,964 with regard to the maximum angular movement of the toggle plate without incurring sliding contact between co-operating bearings;

Fig. 5 is a fragmentary view showing a toggle mechanism bearing arangement in accordance with the present invention with a schematic illustration of the angular relationship between the path of the force transmitted through the toggle plate and the common tangent line between cooperating bearings;

Fig. 6 is a fragmentary view showing a toggle mechanism bearing arrangement in accordance with the patent to Blake et al., U.S. 226,964, with a schematic illustration of the angular relationship between the path of the force transmitted through the toggle plate and the common tangent line between cooperating bearings;

Fig. 7 is a graph showing a comparison between the toggle mechanism bearing arrangements of the present invention and of the patent to Blake et al., U.S. 226,964, with regard to the angular relationship between the path of the force transmitted through the toggle plate and the common tangent line between cooperating bearings;

Figure 1:
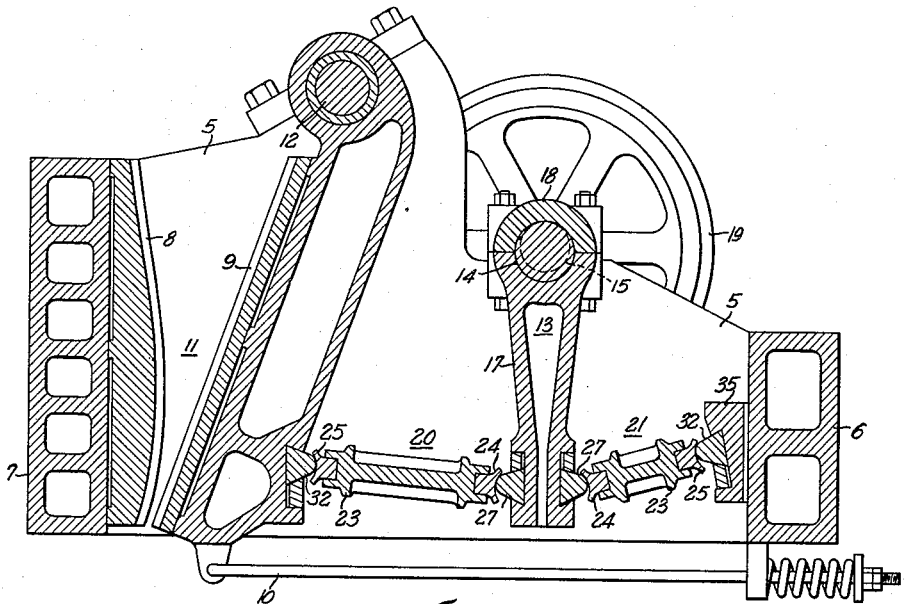
Fig. 1 is a section taken through a jaw crusher having a toggle mechanism bearing arrangement embodying features of the invention.

The jaw crusher shown in Fig. 1 comprises a pair of parallel side walls 5, only one of which is shown, spaced apart by transverse members 6 and 7 to form a frame. A shaft 12 journaled in side walls 5 carries a swing jaw 9 which is movable relative to a stationary jaw 8 secured to transverse frame member 7. A crushing chamber 11 is defined between swing jaw 9 and stationary jaw 8. Swing jaw 9 is oscillated by actuating means 13, which includes a pitman 17, disposed between motion resisting members comprising swing jaw 9 and transverse frame member 6. Toggle means 20 connects swing jaw 9 with the actuating means 13 and toggle means 21 connects actuating means 13 with transverse frame member 6. The motion of actuating means 13 is converted and imparted to swing jaw 9 by toggle means 20 and 21. Spring equipped tension rods 10 function to bias swing jaw 9 in one direction to maintain the engaged arrangement of toggle means 20 and 21 with swing jaw 9, pitman 17 and transverse frame member 6.

Actuating means 13 includes a driven shaft 15 journaled in side walls 5 of the crusher frame. An eccentric portion 14 of shaft 15 is journaled in a bearing portion 18 of pitman 17. Flywheels 19, only one of which is shown, are keyed to portions of driven shaft 15 extending outward of the side walls 5 and either flywheel may function as a driving pulley.

Toggle means 20 and 21 are substantially similar and a description of toggle means 21 will serve as a description of toggle means 20. Toggle means 21, shown in Fig. 2, comprises toggle plate 23 having a bearing 24 at one end and a bearing 25 at the other end, the bearings being secured to toggle plate 23 by bolts 26. Bearing 24 engages bearing 27 mounted in a recess 29 of pitman 17. A wedge 30 secured to pitman 17 by bolts 31, only one of which is shown, is utilized to fasten bearing 27 to pitman 17. Bearing 25 engages a bearing 32 secured in a similar manner to a block 35 carried by transverse frame member 6. A wedge 33 holds bearing 32 in a recess 36 in block 35 by means of bolts 31, only one of which is shown.

Figure 2:
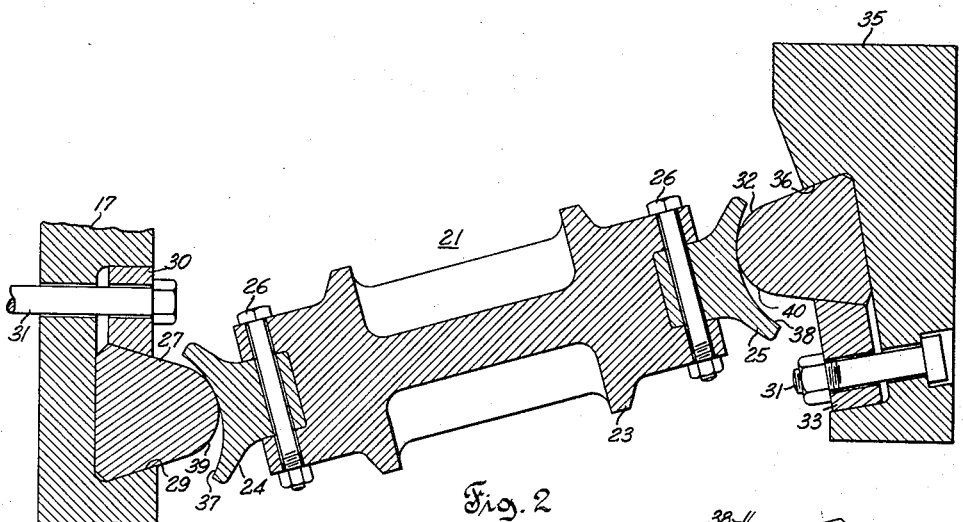
Fig. 2 is an enlarged fragmentary section of the bearing arrangement shown in Fig. 1.

Bearings 24 and 25 are respectively provided with concavely curved bearing surfaces 37 and 38. Convex bearing surfaces 39 and 40 are respectively formed on bearings 27 and 32 for respective engagement with curved bearing surfaces 37 and 38. Although both bearing surfaces 37, 38 are shown in Fig. 2 as concave surfaces, one of them may be convex, in which case the complementary bearing bar must be concave.

In providing for a continuous rolling contact between engaging bearing surfaces the choice of values for the radii of a specific pair of complementary bearing surfaces, such as 37 and 39, is dictated by the angular movement of toggle means 20 relative to jaw 9 and pitman 17 and the angular movement of toggle means 21 relative to pitman 17 and frame member 6. The relationship between the radii and the angular movement of toggle plate 23 is an empirical one.

Figure 3:
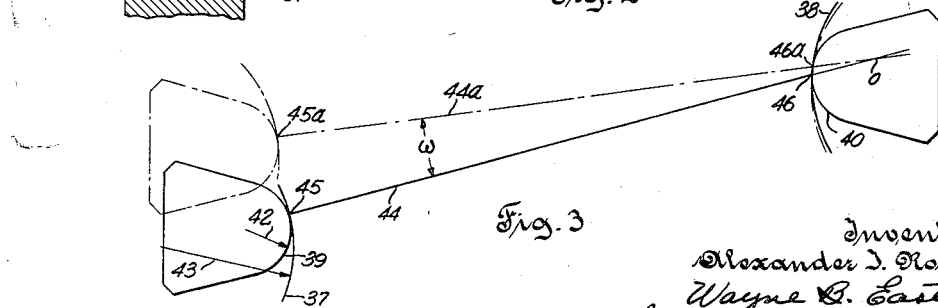
Fig. 3 is a diagrammatic illustration showing the limiting positions of angular movement of a toggle plate of a jaw crusher toggle mechanism having the bearing arrangement shown in Fig. 1.

Fig. 3 illustrates schematically the angular movement of toggle means 21 when swing jaw 9 of the crusher is operating and the pitman 17 is moving within its prescribed orbit. Line 44 represents toggle means 21 in one limiting position of travel and line 44a represents it in the other limiting position in the opposite direction of travel. The angular movement of toggle means 21 relative to frame member 6 is represented by an angle ω between the lines 44 and 44a, measured from an apex 0.

The selected radius 43 of the concave bearing surface 37 must be sufficiently greater than the radius 42 of the convex bearing surface 39 to cause a rolling contact between the engaging bearing surfaces during the entire angular movement of toggle means 21 between the predetermined limiting positions 44, 44a. It has been empirically determined that the radius 43 should never be substantially less than twice the radius 42, nor should the angular displacement ω of the member 23 be substantially greater than seven and one-half degrees. When the selected ratio of the radius 43 to the radius 42 is substantially two and five-eighths to one the angular displacement ω of the member 23 should not be greater than substantially seven and one-half degrees. When the selected radius 43 is twice the radius 42 the angular displacement ω of the member 23 should not be greater than substantially five and one-half degrees between limiting positions.

Inasmuch as the roughness of the engaging bearing surfaces influences the rolling contact of the complementary bearing surfaces of the antifriction motion translating device, the most favorable results are obtained when the engaging bearing surfaces have a degree of finish maintained within the limits of 350 to 500 micro inches.

The unit of measurement in determining the radii of the engaging bearing surfaces is omitted, since the unit used may be assumed to be one reasonably commensurate with the unit of measurement adopted in constructing the other parts of the crusher, and hence merely a proportional relationship has been set forth.

The operation of the toggle mechanism bearing arrangement is illustrated in Fig. 3 wherein the toggle plate 23 of the toggle means 21 is indicated as being in the lowermost limiting position of travel by the line 44. The member 23 is similarly shown in Fig. 2 in the same relative position. In this position, concave bearing surface 37 engages with the convex bearing surface 39 along an initial line of contact 45 (the line of contact 45 being parallel to the engaging bearing surfaces). The concave bearing surface 38 on the opposite end of the member 23 engages the convex bearing surface 40 of the bearing 32 along a line of contact 46 (the line of contact 46 being parallel to the engaging surfaces). In response to a substantially 180 degree rotation of the eccentric 15 the member 23 will be angularly displaced to an uppermost limiting position as designated by the line 44a. During this displacement of toggle plate 23 the concave bearing surface 37 will have rolled downward on the convex bearing surface 39 to a line of contact 45a. At the same time the concave bearing surface 38 will have moved upward on the convex bearing surface 40 to a line of contact as indicated by reference character 46a. For any intermediate position of the member 23 between limiting positions 44 and 44a the complementary bearing surfaces will at all times be in rolling contact. By providing a rolling contact between complementary bearing surfaces, it is possible to eliminate bearing lubricant entirely. The absence of lubricant prolongs the life of the bearings because there is no medium present to hold dirt in suspension between the bearing surfaces to form the equivalent of a grinding compound. Furthermore, the rolling action of the engaging bearings prevents scuffing and scoring of the bearing surfaces which was so commonly experienced in the sliding type motion translating devices.

For the purpose of comparing the results obtainable with the present invention and with the most pertinent prior art, namely, a patent to Blake et al., U.S. 226,964, a model of a jaw crusher was constructed. The model was equipped with interchangeable bearing surfaces to facilitate comparative tests between the toggle mechanism of the present invention, in which the toggle plates have concave bearing surfaces, and the toggle mechanism shown in the Blake patent in which the toggle plates have convex bearing surfaces. The bearing connection between the jaw crusher frame and the rear toggle plate, which is the toggle plate furthest from the jaw, is subjected to the most wear in commercial jaw crushers and it was the corresponding bearing connection on the model for which test results were obtained. The pitman of the model was provided with a variable throw so as to ascertain the maximum angular movement of the rear toggle plate, relative to the frame, at which the bearing surfaces stop rolling and start to slide with respect to each other. This was determined for selected bearing ratios for both the toggle mechanism of the present invention and the toggle mechanism of the Blake patent. The comparative results are indicated in the graph of Fig. 4 in which the horizontal axis indicates the ratio between the concave and convex bearing surfaces, and the vertical axis indicates the maximum throw of the pitman in inches at which no sliding occurred between the bearing surfaces. Referring to the graph of Fig. 4, it is to be noted that when the ratio of radii between the concave and convex surfaces is 2, the maximum throw of the pitman before slippage between the bearing surfaces occurs is four and one-half inches for the bearing arrangement of the present invention (Fig. 5) but is only one and one-half inches for the bearing arrangement of the Blake patent (Fig. 6). The maximum throw of the pitman in a jaw crusher embodying the toggle bearing arrangement of the present invention is therefore on the order of three times greater than the throw of the pitman in a jaw crusher embodying the toggle bearing arrangement of the Blake patent, without incurring slippage between the bearing surfaces.

The model of a jaw crusher was also utilized to determine the principle of operation involved in the toggle mechanism bearing arrangements of the present invention and of the Blake patent. With the use of the model the force diagrams of the toggle mechanisms of the present invention and of the Blake patent shown respectively in Figs. 5 and 6 were determined. Each of these figures shows a fragmentary view of a toggle plate bearing engaging a bearing mounted on the frame portion of a jaw crusher. In Fig. 5 the axis of the concave bearing surface is indicated at A and the axis of the convex bearing surface is indicated at B. In Fig. 6 the axis of the concave bearing surface is indicated at C and the axis of the convex bearing surface is indicated at D. In each of the figures it is schematically illustrated that the cooperating bearing surfaces have a common tangent line at the point of contact between the bearings, indicated by line RX in Fig. 5 and by line BY in Fig. 6. The significance of the common tangent line in each case is that there is a tendency for the cooperating bearing surfaces to slip with respect to each other along the common tangent line. The path of the force transmitted through the toggle plate in each case is represented in Fig. 5 by line RM and in Fig. 6 by line BN. In each case the path of force through the toggle plate is transmitted from the pitman to the frame and it is in the direction of the path of force that the crushing pressures are transmitted. The angle that the path of force makes with the tangent line changes constantly during each cycle of operation and is represented by P in Fig. 5 and by S in Fig. 6. When the angle P or S, as the case may be, is 90°, there is no tendency for the cooperating bearing surfaces to slip with respect to each other but, when the angle is less than 90°, the tendency for the surfaces to slip with respect to each other increases as the angle P or S decreases.

In the toggle mechanism bearing arrangements of the present invention and of the Blake patent, the angle between the path of force and the common tangent line of the cooperating bearing surfaces changes constantly during each cycle of the pitman and the model was used to obtain comparative measurements of this angle at several points in the cycle. For this comparison the ratio of the concave bearing surface to the convex bearing surface was two to one for each of the curves in the graph of Fig. 7. Referring to the graph shown in Fig. 7, the vertical axis of the graph represents the acute angle between the path of force (through the toggle plate) and the common tangent line of the cooperating bearing surfaces, and the horizontal axis represents the angular displacement of the eccentric which actuates the pitman. The graph of Fig. 7 indicates how the acute angle between the path of force and the common tangent line of the cooperating bearing surfaces changes continuously during two complete cycles of the pitman. In the toggle mechanism of the present invention the angle between the path of force and the tangent line is never less than 84½° whereas such angle in the mechanism of the Blake patent is as low as 79½° at one point in the cycle. This means that the maximum force component which tends to cause slippage between the bearing surfaces in the mechanism of the present invention is only about one-half as great as the maximum force component which tends to cause slippage between the bearing surfaces in the Blake mechanism, because the path of force through the toggle plate of the present invention is never more than 5½° (90°—84½°) from a line perpendicular to the tangent line whereas the path of force through the toggle plate in the Blake mechanism deviates as much as 10½° (90°—79½°) from a line perpendicular to the tangent line. Therefore, as the angular deviation of the path of force transmitted through the toggle plate increases relative to a line perpendicular to the common tangent line of the cooperating bearing surfaces, the greater is the tendency of the cooperating bearings to slip with respect to each other. As indicated in the graph of Fig. 7, this angular deviation for the Blake bearing arrangement is on the order of twice the angular deviation for the bearing arrangement of the present invention.

Figure 8:
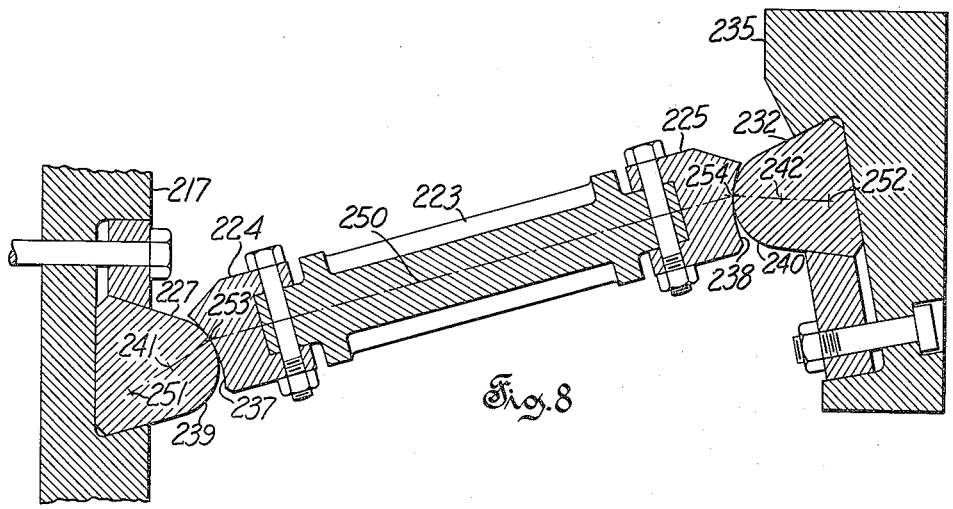
Fig. 8 is a fragmentary view of a toggle mechanism bearing arrangement according to the present invention showing concave bearings mounted in different positions than shown in Figs. 1 and 2.
Figure 9:
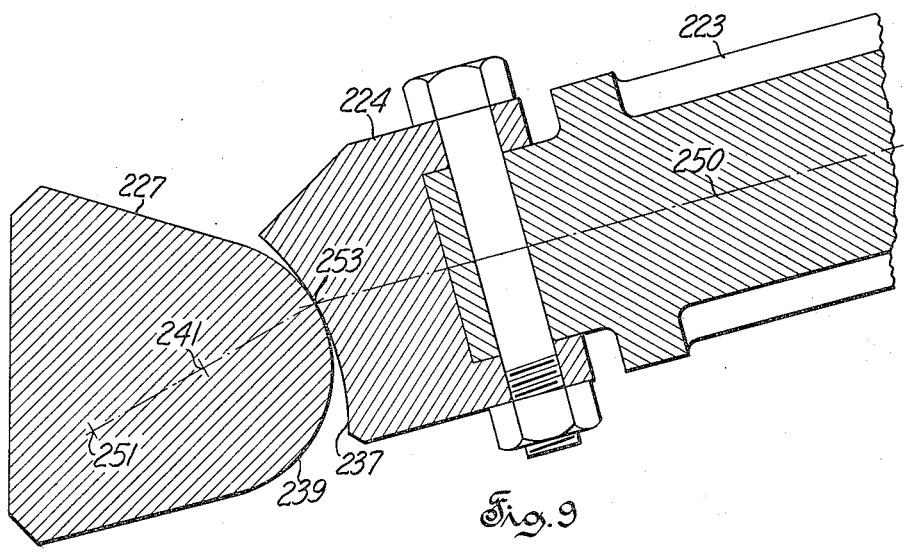
Fig. 9 is an enlarged fragmentary view showing only the left side of Fig. 8.

Referring now to Figs. 8 and 9, the toggle plate there shown is of a different construction than the toggle plates shown in Figs. 1 and 2. Fig. 8 corresponds generally to Fig. 2 except that in Fig. 8 the positions of the axes of the concave bearing surfaces are lower relative to the toggle plate than in Fig. 2.

With the particular bearing arrangement of the present invention shown in Figs. 1 and 2, the toggle plates operate at lower positions relative to the bearings on the jaw, pitman and frame than do toggle plates equipped with conventional sliding type bearings which have the same radii of curvature as the complementary bearings on the jaw, pitman and frame of the crusher. In such case when a toggle plate operates in the lower position, as in Figs. 1 and 2, the toggle plate is subjected to eccentric loading which tends to bend the toggle plate. This is because the force transmitted through a toggle plate which operates in the lower position has a path which is above a plane which divides the toggle plate into upper and lower halves. In large jaw crushers in which forces up to about 1,500,000 pounds are transmitted through the toggle plates, the eccentric loading referred to tends to deflect and cause bending of the toggle plates. It has been found by the present inventor that this eccentric loading can be avoided if the axis of each of the concave bearings on the toggle plate is spaced a predetermined distance, depending on the physical characteristics of the crusher, such as the weight of the toggle plate and tensioning of tension bar 10, below the plane which divides the toggle plate into upper and lower halves. The purpose and object of such construction is to cause the path of the force transmitted through the toggle plate to substantially coincide with the dividing plane referred to so as to avoid eccentric loading of the toggle plate. Eccentric loading of a toggle plate results when the path of the force transmitted through the toggle plate is above or below the dividing plane referred to.

Referring to Fig. 8, a toggle plate 223 is shown positioned between a pitman 217 and a frame portion 235 of a jaw crusher. Bearings 227 and 232 having convex surfaces 239 and 240, the respective axes of which are indicated at 241 and 242, are mounted respectively on pitman 217 and frame portion 235. Cooperating bearings 224 and 225 are mounted on the ends of toggle plate 223 and have concave bearing surfaces 237 and 238 which are sufficiently larger respectively than convex bearing surfaces 239 and 240 to obtain only rolling contact therebetween as explained in connection with Figs. 1 and 2. Referring to Fig. 8 and Fig. 9, which is an enlarged view of the left side of Fig. 8, reference numeral 250 indicates a plane which divides toggle plate 223 into upper and lower halves. According to the present invention, axes 251 and 252 of concave bearing surfaces 237 and 238 are positioned below plane 250 a predetermined distance, depending on the physical characteristics of the particular crusher, such that the line of contact 253 between surfaces 239 and 237 and the line of contact 254 between surfaces 238 and 240 are in plane 250. In general, the path of the force transmitted through toggle plate 223 must inherently extend through the respective lines of contact 253 and 254. It is only in accordance with the present invention, however, that the path of force substantially coincides with the plane 250 which divides toggle plate 223 into upper and lower halves to avoid eccentrically loading toggle plate 223 during operation of the jaw crusher.

From the foregoing it will be apparent to those skilled in the art that the illustrated embodiment of the invention provides a new and improved toggle mechanism bearing arrangement for jaw crushers, and accordingly accomplishes the objects of the invention. On the other hand, it will be obvious to those skilled in the art that the illustrated embodiment of the invention may be variously changed and modified, or features thereof, singly or collectively, embodied in other combinations than that illustrated, without departing from the spirit of the invention, or sacrificing all of the advantages thereof, and that accordingly the disclosure herein is illustrative only, and the invention is not limited thereto.

It is claimed and desired to secure by Letters Patent:

1. A jaw crusher comprising a frame, a fixed jaw mounted on said frame, a swing jaw pivotally mounted on said frame and cooperating with said frame and with said fixed jaw to define a crushing chamber, a pitman, means for actuating said pitman, two toggle plates disposed respectively in force transmitting relation between and in angularly movable relation to said swing jaw and said pitman and between and in angularly movable relation to said pitman and said frame, a group of bearings mounted on said swing jaw and said pitman and said frame including at least one convex bearing having a convex surface, and bearings mounted on the ends of said toggle plates which cooperate respectively with said group of bearings including a concave bearing which engages said convex bearing and has a concave surface of sufficiently greater radius than said convex surface to cause only a rolling contact between said surfaces during the entire angular movement of the toggle plate to which said concave bearing is attached relative to said convex bearing, the axis of said concave bearing being spaced a predetermined distance below a plane which divides the toggle plate to which the concave bearing is attached into upper and lower halves so that the path of the force transmitted through such toggle plate substantially coincides with said plane to avoid eccentric loading which would cause the toggle plate to deflect.

2. A jaw crusher comprising a frame, a fixed jaw mounted on said frame, a swing jaw pivotally mounted on said frame and cooperating with said frame and with said fixed jaw to define a crushing chamber, a pitman, means for actuating said pitman, first and second toggle plates disposed respectively in force transmitting relation between and in angularly movable relation to said swing jaw and said pitman and between and in angularly movable relation to said pitman and said frame, a group of bearings mounted on said swing jaw and said pitman and said frame including at least two convex bearings having convex surfaces, and bearings mounted on the ends of said toggle plates which cooperate respectively with said group of bearings including two concave bearings for said first toggle plate which respectively engage said convex bearings and have concave surfaces of sufficiently greater radii respectively than said convex surfaces to cause only a rolling contact between each cooperating pair of said surfaces during the entire angular movement of said first toggle plate, the axes of said concave surfaces being spaced predetermined distances below a plane which divides said first toggle plate into upper and lower halves so that the path of the force transmitted through said first toggle plate substantially coincides with said plane to avoid eccentric loading which would cause said first toggle plate to deflect.

3. A jaw crusher comprising a frame, a fixed jaw mounted on said frame, a swing jaw pivotally mounted on said frame and cooperating with said frame and with said fixed jaw to define a crushing chamber, a pitman, means for actuating said pitman, first and second toggle plates disposed respectively in force transmitting relation between and in angularly movable relation to said swing jaw and said pitman and between and in angularly movable relation to said pitman and said frame, a group of bearings mounted on said swing jaw and said pitman and said frame including at least two convex bearings having convex surfaces, and bearings mounted on the ends of said toggle plates which cooperate respectively with said group of bearings including two concave bearings for said second toggle plate which respectively engage said convex bearings and have concave surfaces of sufficiently greater radii respectively than said convex surfaces to cause only a rolling contact between each cooperating pair of said surfaces during the entire angular movement of said second toggle plate, the axes of said concave surfaces being spaced predetermined distances below a plane which divides said first toggle plate into upper and lower halves such that the path of the force transmitted through said second toggle plate substantially coincides with said plane to avoid eccentric loading which would cause said second toggle plate to deflect.

References Cited in the file of this patent

UNITED STATES PATENTS

| | | |
|---|---|---|
| 187,375 | Hall | Feb. 13, 1877 |
| 226,964 | Blake et al. | Apr. 27, 1880 |
| 2,287,417 | De Mattia | June 23, 1942 |

FOREIGN PATENTS

| | | |
|---|---|---|
| 365 of 1880 | Great Britain | Jan. 27, 1880 |
| 158,362 | Germany | Feb. 23, 1905 |